United States Patent [19]
Chan et al.

[11] Patent Number: 6,112,814
[45] Date of Patent: Sep. 5, 2000

[54] METHOD FOR CLEANING WELLBORE SURFACES USING COILED TUBING WITH A SURFACTANT COMPOSITION

[75] Inventors: Albert F. Chan, Plano, Tex.; William Mark Bohon; David J. Blumer, both of Anchorage, Ak.; Kieu T. Ly, Richardson, Tex.

[73] Assignee: Atlantic Richfield Company, Los Angeles, Calif.

[21] Appl. No.: 09/023,916

[22] Filed: Feb. 13, 1998

[51] Int. Cl.⁷ .............................. E21B 37/00; E21B 43/40
[52] U.S. Cl. ..................... 166/304; 166/267; 166/312; 166/384; 134/22.19; 507/211; 507/261; 507/266; 507/927; 507/929
[58] Field of Search ....................... 166/263, 291, 166/304, 311, 312, 384, 267; 507/211, 261, 262, 266, 927, 929; 134/22.19; 510/421, 422, 435, 470

[56] References Cited

U.S. PATENT DOCUMENTS

| | | | |
|---|---|---|---|
| 3,070,162 | 12/1962 | Barnard, Jr. . | |
| 3,529,666 | 9/1970 | Crowe | 166/300 |
| 3,653,441 | 4/1972 | Tuttle | 166/291 |
| 3,756,319 | 9/1973 | Holm et al. | 166/304 |
| 3,884,302 | 5/1975 | Messenger | 166/291 |
| 4,423,781 | 1/1984 | Thomas | 166/312 |
| 4,528,106 | 7/1985 | Grolitzer . | |
| 4,565,647 | 1/1986 | Llenado | 252/354 |
| 4,648,453 | 3/1987 | Nagra et al. | 166/281 |
| 4,668,408 | 5/1987 | McClaflin et al. | 166/304 X |
| 4,681,164 | 7/1987 | Stacks | 166/304 |
| 4,813,482 | 3/1989 | Walton | 166/312 X |
| 4,856,589 | 8/1989 | Kuhlman et al. | 507/211 |
| 4,919,204 | 4/1990 | Baker et al. | 166/312 X |
| 4,985,154 | 1/1991 | Balzer et al. | 507/211 |
| 5,030,366 | 7/1991 | Wilson et al. . | |
| 5,164,116 | 11/1992 | Berkhof et al. | 252/331 |
| 5,221,343 | 6/1993 | Grauer et al. | 106/729 |
| 5,374,361 | 12/1994 | Chan | 507/211 |
| 5,439,058 | 8/1995 | Malbrel et al. | 166/384 X |
| 5,458,197 | 10/1995 | Chan | 166/304 |
| 5,458,198 | 10/1995 | Hashemi et al. | 166/312 |
| 5,466,746 | 11/1995 | Geck et al. | 524/837 |
| 5,627,144 | 5/1997 | Urfer et al. | 507/211 |
| 5,678,631 | 10/1997 | Salisbury et al. | 166/304 |
| 5,830,831 | 11/1998 | Chan et al. | 507/211 |

OTHER PUBLICATIONS

"Interfacial Tensions and Solubilizing Ability of a Microemulsion Phase that Coexists With Oil and Brine", *Journal of Colloid and Interface Science*, vol. 71, No. 2., Sep. 1979.
SPE 25181 "Surfactants: Additives to Improve the Performance of Properties of Cements" by K. M. Cowan, Shell Development Co., and Larry Eoff, Halliburton Services, Society of Petroleum Engineers, Inc., 1993.
"Product Line of Sugar Lipids", SIMULSO*SL, SEPPIC, Inc., 30 Two Bridges Road, Suite 225, Fairfield, N. J. 07006, (undated).
Alkyl Polyglycosides: Technology, Properties and Applications, edited by Karlheinz Hill, Wolfgan Von Rybinski and Gerhard Stoll, VCH Verlagegesellschaft Mbh, D–69451 Weinhein (Federal Republic of Germany) and VCH Publishers Inc., New York, New York 1997, pp. 11–12.

*Primary Examiner*—George Suchfield
*Attorney, Agent, or Firm*—F. Lindsey Scott

[57] ABSTRACT

A method for cleaning a wellbore plugged with deposits of heavy hydrocarbons and finely-divided inorganic solids by circulating a surfactant composition containing an alkyl polyglycoside, an ethoxylated alcohol, a caustic and an alkyl alcohol through the wellbore with a coiled tubing.

17 Claims, 4 Drawing Sheets

2(a)  2(b)  2(c)  2(d)

METHOD FOR CLEANING WELLBORE SURFACES USING COILED TUBING WITH A SURFACTANT COMPOSITION

BACKGROUND OF THE INVENTION

1. Field of the Invention

This invention relates to the removal of plugging deposits comprising heavy hydrocarbonaceous materials and finely divided inorganic solids from a plugged wellbore using a coiled tubing and an alkyl polyglycoside surfactant composition.

2. Background of the Invention

Mixtures of oil, gas and water are frequently produced from oil fields. Processes for treating such mixtures to produce separate streams of oil, gas and water are well known. Typically the oil is separated and recovered as a product; the gas may be separated and recovered as a product; or, alternatively, the gas may be injected into a gas cap above an oil-bearing zone, into an oil-bearing zone or the like as recovered or as a miscible injectant which comprises the produced gas adjusted by the addition of nitrogen, carbon dioxide, hydrocarbons containing from one to about five carbon atoms and the like to adjust the specific gravity of the miscible injectant. The water may be recovered for reinjection or disposal by other means as known to those skilled in the art.

The separation is frequently accomplished in large settling tanks where the oil, gas and water are allowed to gravimetrically separate.

In many instances, the mixture of oil, gas and water is passed to central processing facilities for separation with the oil being recovered as a product and with the gas being either wholly or partially recovered as a product also. In some instances, the gas is distributed to injection wells and injected; and, in some fields, the water is similarly recovered, passed to injection wells and injected into the formation for the disposal of the water, for secondary oil recovery and the like.

It has been found, when such operations are conducted, especially when corrosion inhibitors are used in the lines leading from the wells to the central processing facility and the like, that, over a period of time, deposits of heavy hydrocarbonaceous materials and finely divided inorganic solids deposit on the inner surfaces of the lines. These deposits typically comprise finely-divided inorganic particles such as produced solids which may include hydraulic fracturing proppant, formation sand, formation fines and precipitates of materials such as iron sulfide. These particles become coated with corrosion inhibitor or other hydrocarbonaceous materials and subsequently become coated with additional quantities of heavy hydrocarbonaceous material in the flowlines, settling tank and the like. These deposits are referred to herein as "schmoo". The schmoo is a slimy, oily substance which adheres to almost any surface with which it comes in contact, and is difficultly removed from any surface and particularly from the inner surfaces of flowlines, water injection lines into the formation, wellbore surfaces and the like. The material is removable by pigging from flowlines which are of a sufficient size and configuration that pigs can be run through the lines. Such lines are routinely cleaned by pigging. Other lines, such as injection lines into wells, small diameter flowlines, the settling tank surfaces and formation surfaces are not accessible by pigging operations and, accordingly, the schmoo accumulates on the inner surfaces of these pipe lines, on the surfaces of the well and the like. The schmoo can also accumulate to a thickness such that it flakes off the inner surfaces of the pipe and deposits in the lower portion of a well, the lower portion of a line or the like, and plugs the line or the formation in fluid communication with the pipe. This can result in the necessity for cleaning operations such as the use of coiled tubing with the injection of organic solvents such as mixtures of diesel oil and xylene, to clean such deposits from wellbores. Such deposits in wellbores are particularly common in wells which are used for alternating water and gas injection. In such wells, the schmoo dries on the inner surfaces of the tubing during gas injection and subsequently cracks and falls into the wellbore, thereby eventually plugging the wellbore, sometimes to a considerable depth.

In view of the difficulties created by the deposit of such materials, a continuing search has been directed to the development of an economical method for the removal of such deposits, especially deposits which have dried and fallen into the wellbore or otherwise been deposited into the wellbore to the extent that the wellbore is plugged with such deposits.

SUMMARY OF THE INVENTION

According to the present invention, it has been found that such plugged wells can be unplugged by positioning a coiled tubing to extend from a surface into the wellbore; injecting a surfactant composition consisting essentially of an aqueous solution containing from about 0.1 to about 10.0 weight percent of an alkyl polyglycoside surfactant selected from alkyl polyglycosides containing alkyl groups containing from about 8 to about 19 carbon atoms and mixtures thereof; from about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl alcohols and the ethoxylated alkyl phenols; from about 0.5 to about 10.0 weight percent of a caustic selected from the group consisting of sodium hydroxide, potassium hydroxide, ammonium hydroxide and mixtures thereof; and, from about 0.1 to about 6.0 weight percent of at least one alkyl alcohol containing from about 4 to about 6 carbon atoms, through the coiled tubing into contact with the deposits and circulating at least a portion of the surfactant solution through the wellbore.

DESCRIPTION OF PREFERRED EMBODIMENTS

Figure 1:
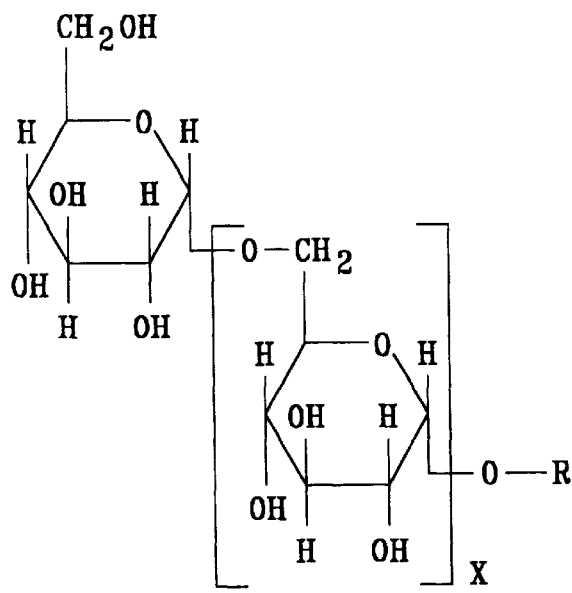
FIG. 1 is a diagram of the molecular structure of an alkyl polyglycoside.

In the discussion of the figures, various pumps, valves and the like necessary to achieve the flows described have not been shown in the interest of conciseness. All concentrations are by weight percent of active ingredient in the aqueous solution unless otherwise stated.

The surfactant composition of the present invention consists essentially of an aqueous solution containing from about 0.1 to about 10.0 weight percent, and preferably from about 0.2 to about 4.0 weight percent, of an alkyl polyglycoside surfactant selected from alkyl polyglycosides containing alkyl groups containing from about 8 to about 19 carbon atoms and mixtures thereof; from about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl phenols and the ethoxylated alkyl alcohols; from about 0.5 to about 10.0 weight percent of a caustic selected from the group consisting of sodium hydroxide, potassium hydroxide, ammonium hydroxide and mixtures thereof; and, from about 0.1 to about 6.0 weight percent of at least one alkyl alcohol containing from about 4 to about 6 carbon atoms. Preferably, the alkyl polyglycoside, ethoxylated alcohol, and alkyl alcohol comprise from about 0.5 to about 6.0 weight percent of the aqueous solution. Desirably, the alkyl polyglycoside surfactant has a DP number from about 1.30 to about 1.80. The DP number is a measure of the degree of polymerization of the alkyl polyglycoside as defined in *Alkyl Polyglycosides: Technology, Properties and Applications*, edited by Karlheinz Hill, Wolfgang Von Rybinski and Gerhard Stoll, VCH Verlagegesellschaft Mbh, Weinhein (Federal Republic of Germany) and VCH Publishers Inc., New York, N.Y. 1997, pp 11–12.

The alkyl polyglycoside surfactant may comprise a first surfactant consisting essentially of an alkyl polyglycoside selected from the group consisting of alkyl polyglycosides containing alkyl groups containing an odd number of carbon atoms from about 9 to about 13 carbon atoms and mixtures thereof, and having an oligomer distribution from 1 to 12, and a second surfactant consisting essentially of alkyl polyglycosides selected from the group consisting of alkyl polyglycosides containing alkyl groups, a major portion of which are even numbered alkyl groups which contain from about 12 to about 18 carbon atoms and having an oligomer distribution from 1 to 12. Desirably, the alkyl polyglycoside surfactant contains from about 20 to about 90 mole percent of the first surfactant.

The second surfactant may also contain alkyl polyglycosides containing alkyl groups containing odd numbers of carbon atoms from about 9 to about 19 carbon atoms. Either odd-numbered or even-numbered alkyl groups may be used in either the first or the second surfactant as desired to optimize the surfactant properties.

The even numbered alkyl groups are representative of naturally occurring alkyl groups and tend to have a higher pour point and are less convenient to use as surfactants in wellbore operations and the like. Such surfactants are much more viscous and tend to gel at lower temperatures and are otherwise more difficult to handle than the corresponding alkyl polyglycosides containing alkyl groups containing an odd number of carbon atoms. The alkyl groups containing odd numbers of carbon atoms are representative of refinery product streams and are not naturally occurring.

Preferably, the ethoxylated alcohol is present in an amount equal to from about 0.2 to about 4.0 weight percent. The ethoxylated alkyl alcohol may be selected from ethoxylated linear alkyl alcohols, branched alkyl alcohols, Guerbet alcohols, mixtures thereof, and the like. The ethoxylated alkyl phenol alcohols may contain linear, branched, Guerbet or a mixture of linear, branched and Guerbet alkyl groups. It is preferred that the ethoxylated alcohol be selected from ethoxylated alkyl alcohols containing from about 8 to about 16 carbon atoms in the alkyl alcohol and from about 2 to about 6 ethylene oxide groups.

The caustic material is desirably present in an amount equal to from about 1.0 to about 5.0 weight percent of the aqueous solution. The caustic is a necessary component of the surfactant composition since it is required in combination with the alkyl polyglycosides and the ethoxylated alcohol to effectively dissolve and remove the deposits.

It is also preferred that the alkyl alcohol be present in an amount equal to from about 0.2 to about 3.0 weight percent. The alkyl alcohol may be a linear or branched alkyl alcohol. The alcohol facilitates mixing and aqueous surfactant composition stability. In the absence of the alcohol, an alkyl polyglycoside surfactant layer and a caustic layer may form in the surfactant composition. While all of the ingredients are present in each layer, they are present in different proportions. With the alkyl alcohol, a homogenous mixture is readily achieved and maintained.

The surfactant composition comprises primarily water. Accordingly, it is less economical to transport the surfactant composition in this form. It is preferred that the surfactant composition be produced at the location where it is to be used by dilution of an aqueous surfactant concentrate. A concentrate of the aqueous surfactant composition can be produced for dilution with an aqueous solution to produce the surfactant composition. The concentrate composition comprises an aqueous solution containing from about 4.0 to about 20.0 weight percent of an alkyl polyglycoside surfactant selected from alkyl polyglycosides containing alkyl groups containing from about 8 to about 19 carbon atoms and mixtures thereof; from about 1.0 to about 15.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof and ethoxylated alkyl phenols containing from about 8 to about 14 carbon atoms in the alkyl group and from about 2 to about 8 ethylene oxide groups and mixtures thereof and mixtures of the ethoxylated alkyl alcohols and the ethoxylated alkyl phenols; from about 4.0 to about 30.0 weight percent of a caustic selected from the group consisting of sodium hydroxide, potassium hydroxide, ammonium hydroxide and mixtures thereof; and from about 0.5 to about 10.0 weight percent of at least one alkyl alcohol containing from about 4 to about 6 carbon atoms. Concentrated compositions containing more of the materials tend to gel and are more difficult to handle and to dilute to produce the surfactant composition. Preferably, the concentrate composition is from about 4.0 to about 12.0 weight percent alkyl polyglycoside surfactant in the aqueous solution; from about 1.0 to about 8.0 weight percent ethoxylated alcohol in the aqueous solution; from about 6.0 to about 22.0 weight percent caustic in the aqueous solution; and from about 1.0 to about 10.0 weight percent alcohol in the aqueous solution. The alkyl polyglycosides and other materials are as described in conjunction with the surfactant composition above.

While the surfactant compositions may be used at substantially any temperature between their freezing points and their boiling points, it is preferred that they be used at temperatures above about 120° F. At lower temperatures, longer contact times may be required to remove the schmoo.

The concentrate may be used at full strength or at any desired dilution.

It is preferred that the concentrate contain a suitable hydrotrope to improve the phase stability of the concentrate and the surfactant composition. The hydrotrope may be a hydrotrope such as monosodium salt of N-lauryl-β-iminodipropionic acid, an alkyl polyglycoside containing linear or branched alkyl groups containing from about 4 to about 8 carbon atoms and the like.

The surfactant composition functions as an alkaline cleaner which solubilizes and disperses the schmoo by suspending it in the surfactant composition so that the surfactant composition and suspended particulates can be injected directly into subterranean formations without damage to the formation or circulated out of the wellbore.

Since the surfactant composition is a foaming surfactant, it is desirable in many applications to add a suitable quantity of an antifoaming compound such as, for example, a silicon-based antifoam compound. Preferably, the antifoaming additive is added at a concentration of about 10 to about 100 ppm to the aqueous solution containing the caustic before addition of the other materials.

Alkyl polyglycoside surfactants consist of a polar glucose head and an organic carbon chain off of the hemiacetal linkage. A representation of the molecule is shown in FIG. 1. There are two ether oxygens and three hydroxyl groups per glucose unit, plus a terminal hydroxyl group. The lipophilic portion of the molecule resides in the alkyl chain R. R can be a linear or branched alkyl group containing from about 8 to about 18 carbon atoms or a Guerbet alkyl containing from about 9 to about 19 carbon atoms. The polymerization reaction can provide oligomer distributions from 1 to 12 (i.e. x=0 to x=11).

Figure 2:
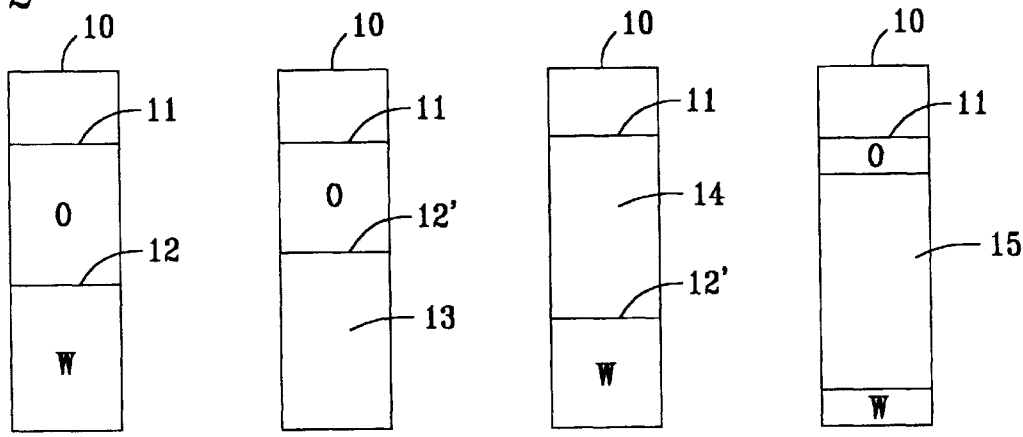
FIG. 2 shows four oil/water systems including Type I, Type II and Type III microemulsions.

In the use of the surfactant composition, it is desirable that the ratio of components be adjusted by testing with the deposits to be removed to form a Type III microemulsion in the wellbore. Such microemulsions are referred to as Windsor Type III or middle phase microemulsions and are described in some detail in "Micellization, Solubilization and Microemulsions", Vol. 2, K. L. Mittal, Plenum Press, New York, 1977. In FIG. 2, Type I, Type II and Type III microemulsions are shown. FIG. 2(a) shows oil (o) and water (w) containing surfactants in a container 10 to a level 11 and having an interface 12. In FIG. 2(b), a Type I microemulsion 13, which is an oil-in-water microemulsion, is shown below an excess oil layer (o). Such microemulsions are water soluble and contain quantities of solubilized oil, as shown by the level of the new interface 12' which is above the original interface 12. In FIG. 2(c), a Type II microemulsion 14, which is a water-in-oil microemulsion, is shown above an excess water layer (w). Such microemulsions are oil soluble and contain quantities of solubilized water as shown by the level of new interface 12' which is below the original interface 12. FIG. 2(d) shows a Type III microemulsion 15, which is located between the excess oil (o) and excess water (w) phases and extends above and below original interface 12. Such Type III microemulsions are preferred for pipe and wellbore cleaning operations since their interfacial tensions and solubilization properties toward both oil and water can greatly facilitate the removal of both from wellbores, pipes or other surfaces. Since it is desirable that the deposits be dissolved and removed in the aqueous surfactant, it is desirable that the aqueous surfactant be formulated to produce a Type III microemulsion in the wellbore or pipe. Such microemulsions are much more effective in dissolving hydrocarbonaceous materials in the presence of aqueous solutions than either Type I or Type II microemulsions. It is not necessary that the composition be adjusted to form the desired Type III microemulsion, but it is considered that the surfactant composition is more effective when adjusted to form a Type III microemulsion in the treated area.

Figure 3:
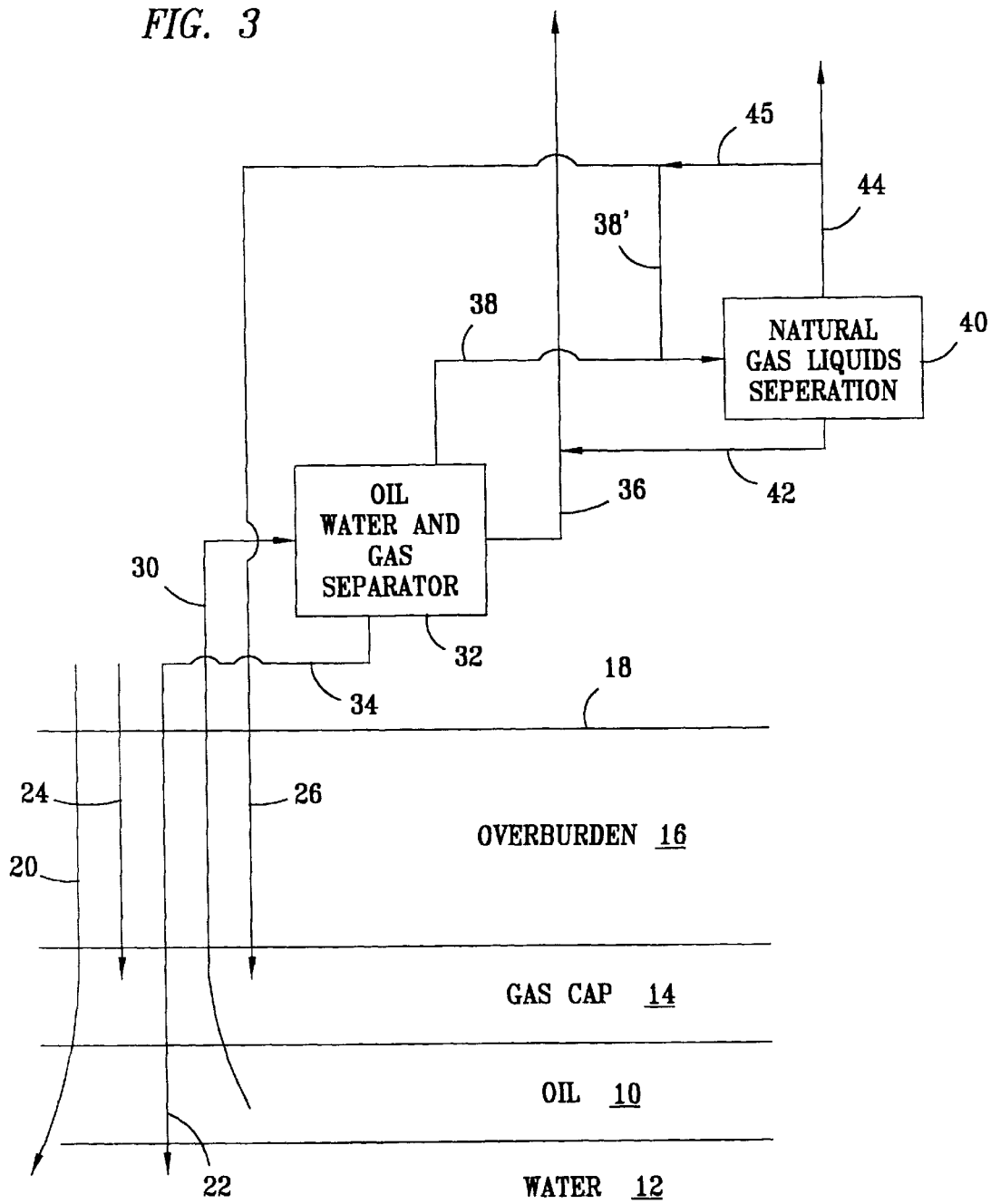
FIG. 3 is a schematic diagram of an oil field operation wherein an oil, gas and water mixture is produced with reinjection of oil, gas and water.

A typical oil field operation which produces such deposits is shown in FIG. 3. In FIG. 3, an oil-bearing formation 10 is shown positioned above a water-bearing formation 12 and beneath a gas cap 14. Gas cap 14, in turn, is positioned beneath an overburden 16 and beneath a surface 18. Oil, gas and water are produced from oil-bearing formation 10 through a line 30. In the operation of the oil field as shown, sea water may be injected into water-bearing formation 12 as shown by an arrow 20, a miscible gas may be injected into gas cap 14 as shown by arrow 24, and produced water may be injected into water-bearing formation 12 as shown by an arrow 22 with produced gas being optionally introduced into gas cap 14 via a line 26. The produced oil, gas and water stream from oil-bearing formation 10 is passed via a line 30 to an oil, water and gas separator 32. Separator 32 is typically a relatively large vessel to allow a quiescent zone for the gravimetric separation of oil, gas and water. The gas may be recovered, as shown, through a line 38 and passed to a natural gas liquids separation zone 40. In natural gas liquids separation zone 40, natural gas liquids such as butanes, pentanes and the like may be recovered and passed via a line 42 to combination with the crude oil which is separated and recovered from separator 32 via a line 36. The crude oil and natural gas liquids in line 36 are passed to sale or use as a crude oil product. The lighter gases from natural gas liquids separation unit 40 may be passed to use as a natural gas product via a line 44 or, as shown, may be combined, via a line 45, with a portion of the natural gas recovered from separator 32 via a line 38' and passed via line 26 back to injection into the gas cap 14. The produced water is recovered through a line 34 from separator 32 and may be passed with or without further treatment back to water formation 12 via line 22.

The operations above have been discussed very generally since such operations are considered to be well known to those skilled in the art. Deposits of heavy hydrocarbonaceous materials in combination with finely divided inorganic particulates may occur in lines such as line 30 through which the oil, gas and water mixture is passed to separator 32, in line 34 which is a produced water injection line, or in any other lines wherein water is present, such as the tubing in water injection and water and gas injection wells and in the formations in fluid communication with such wells. The deposits are generally believed to comprise a finely divided inorganic particle which may comprise hydraulic fracturing proppant (approximately 1000 microns), formation sand (approximately 100 microns), formation fines (approximately 10 microns) and precipitates such as iron sulfide (approximately 1 micron). These finely divided inorganic solids form a site which may become coated with a corrosion inhibitor or with heavy hydrocarbonaceous materials. These materials are found in crude oil and in many instances are believed to selectively adhere to the inorganic particulate particles. The net result is that these coated particles, referred to herein as "schmoo", adhere to pipe surfaces, separator surfaces, formation surfaces, equipment surfaces and nearly any other surface with which they come in contact. They can accumulate over relatively short periods of time to plug formations, lines and the like. As discussed previously, they also contribute to accelerated corrosion of flowlines, injection lines and the like. The larger particles are separated in the settling tank. The smaller particles such as coated iron sulfide, finely dispersed oil and the like are primary constituents of the schmoo in pipes and other surfaces downstream from the separation tank. As a result, these materials, when dispersed in the surfactant composition, can be passed into the formation.

Figure 4:
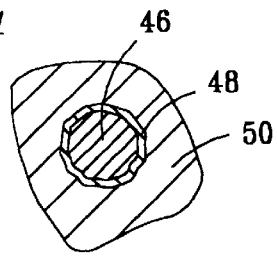
FIG. 4 is a schematic cross-sectional view of a deposit particle containing heavy hydrocarbonaceous materials and a finely divided inorganic particle.

A schematic of a typical particle of schmoo is shown in FIG. 4. The particle comprises an inorganic solid particle nucleus 46 surrounded by a corrosion inhibitor film 48 and by a layer of oil 50. It is believed that, in the oil/water separation step, the oil, which may be heavier hydrocarbonaceous materials, may be selectively retained on the particles with the lighter hydrocarbonaceous materials floating more readily to the surface for recovery as oil. In any event, a sticky, oily mass of this material is typically produced in oil field operations, is readily transported into operating lines, formations and the like, and creates significant operational problems.

Figure 5:
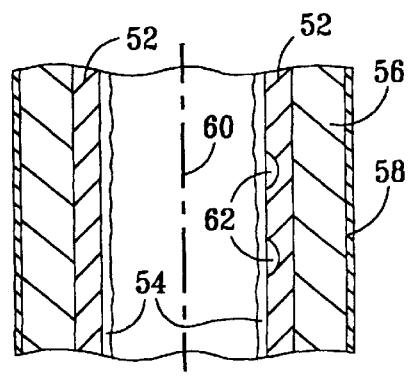
FIG. 5 is a schematic cross-sectional view of a line coated with schmoo on its inner surfaces.

In FIG. 5, a section of a pipe 52 which is encased in insulation 56 and a sheathing 58 is shown. Pipe 52 has a center axis 60 and has become coated on its inner surfaces by a layer of schmoo 54. The schmoo has resulted in the establishment of colonies of bacteria which can generate sulfides and other corrosive materials which are effectively sheltered beneath the layer of schmoo from treatment by conventional biocide materials. Pits 62, as shown, are formed by the bacteria and can lead to early pipe failure. Such pipe failure is typically localized so that the life of the pipe is greatly shortened.

Figure 6:
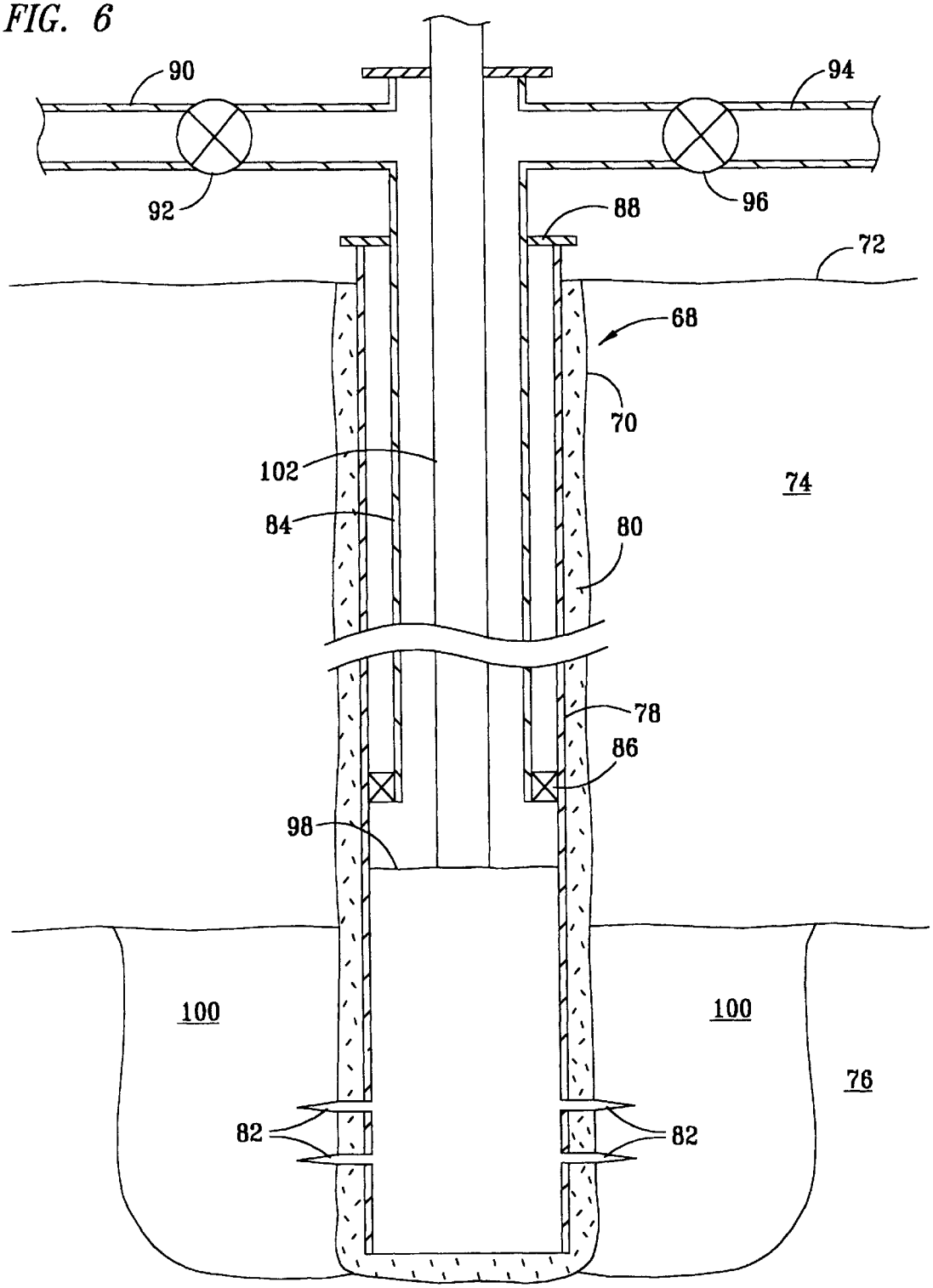
FIG. 6 is a schematic diagram of a water or a water and gas injection well through which water, or alternate slugs of water and gas, are injected into a subterranean formation through a tubing in a casing in the wellbore which has become plugged by deposits showing a coiled tubing positioned in the well.

In FIG. 6, an injection well 68 for water injection or alternate water and gas injection is shown. The injection well comprises a wellbore 70 and includes a casing 78 which is cemented in place in wellbore 70 with cement 80. The well includes a well head 88, which is adapted for the injection of water or alternate slugs of water and gas into well 68. A production tubing 84 extends downwardly from well head 88 inside casing 78 to a depth near a formation 76 into which water and/or gas is to be injected. Casing 78 has been perforated by perforations 82 in formation 76 to permit the injection of water and/or gas into formation 76. It will be understood that well 68 may be completed with or without casing through the formation of interest, as known to those skilled in the art. In other words, the well in the formation of interest may be open hole and the injection may be made directly into formation 76. A packer 86 is positioned between tubing 84 and casing 78 to prevent the flow of liquids or gas upwardly between tubing 84 and casing 78. To inject water into the well a valve 92 in a water injection line 90 is opened and a valve 96 in a gas injection line 94 is closed. Water is then flowed downwardly through tubing 84 and into formation 76. When produced water, for instance from an oil/gas/water separator, is injected it has been found that schmoo deposits on the inner surfaces of the tubing, the casing below packer 86, the perforations, and portions of the formation.

These deposits can become a problem in wells which are used only for water injection. The deposits can accumulate to a level sufficient to restrict flow and, as discussed previously, can accumulate in the lower portions of the well to eventually plug the well and can result in the formation of spots of active bacteria which may result in the formation of pits in tubing 84 which may eventually extend through tubing 84. Accordingly, it is necessary to clean such deposits from the inside of casing 78 below tubing 84 and the inside of any open-hole portion of well 68 extending into or through formation 76. Similarly, such deposits can form in the near wellbore portions of formation 76 and restrict flow into the formation. Such deposits can be removed by a method consisting essentially of circulating the aqueous surfactant composition described above through the well.

In some wells, especially injection wells used for alternate water and gas injection, the schmoo may be deposited in the well and flake off or otherwise be deposited in the bottom of the well to a substantial depth. When such deposits reach a depth such that contact with the surfactant composition at the top of the deposit is not effective to remove the deposits, or when the deposits comprise a sufficient quantity of finely-divided inorganic solids to constitute a plugging problem after removal of the heavy hydrocarbonaceous materials, then it is necessary to use other treatments to remove the schmoo deposits. When the deposits are of a sufficient depth which varies based upon a variety of factors, such as whether the deposits are consolidated or semiconsolidated, the soaking method discussed above is less effective since only a small area at the top of the plugging deposits can be contacted by the surfactant composition.

In such instances coiled tubing treatments, which circulated solvents such as xylene and diesel oil in the well, have been used to remove the plugging deposits. It has now been discovered that the surfactant composition may be used in such coiled tubing treatments.

As shown in FIG. 6, plugging deposits have accumulated in well 68 to a depth 98 which renders their removal by the soaking method difficult. As shown, a coiled tubing 102 extends through tubing 84 into well 68 to a depth near the top of the plugging deposits. The surfactant solution is injected through coiled tubing 102, preferably at a velocity sufficient to maximize the mechanical cleaning action of the coiled tubing and agitate the top layer of the plugging deposits. The coiled tubing may be, and desirably is, equipped with a washing tool, a jet or other suitable tool as known to the art. The injected surfactant composition containing dissolved or entrained heavy hydrocarbonaceous materials and finely-divided inorganic solids is circulated upwardly through the annulus between the outside of the coiled tubing and the inside of the production tubing 84 for recovery at the surface via line 90 or line 94. A variety of circulation arrangements may be used and the coiled tubing can be raised and lowered for multiple passes through the well. As known to those skilled in the art, such circulation can be used to remove particulates from the well. The recovered surfactant composition may be filtered or otherwise cleaned or adjusted prior to re-injection or all fresh surfactant composition may be used. The use of coiled tubing for such operations using other materials is well-known to those skilled in the art and need not be described in further detail.

As the plugging deposits are progressively removed, the coiled tubing may be lowered to keep the surfactant composition injection point near the top of the plugging deposits until substantially all of the plugging deposits have been removed. The well may then be treated to remove schmoo deposits from the near wellbore formation by injecting and maintaining surfactant composition in a near wellbore area 100 for a period of time from about 1 hour to about 4 hours. The surfactant composition is then flushed into the formation by injection of a quantity of an aqueous solution.

EXAMPLE

Figure 7:
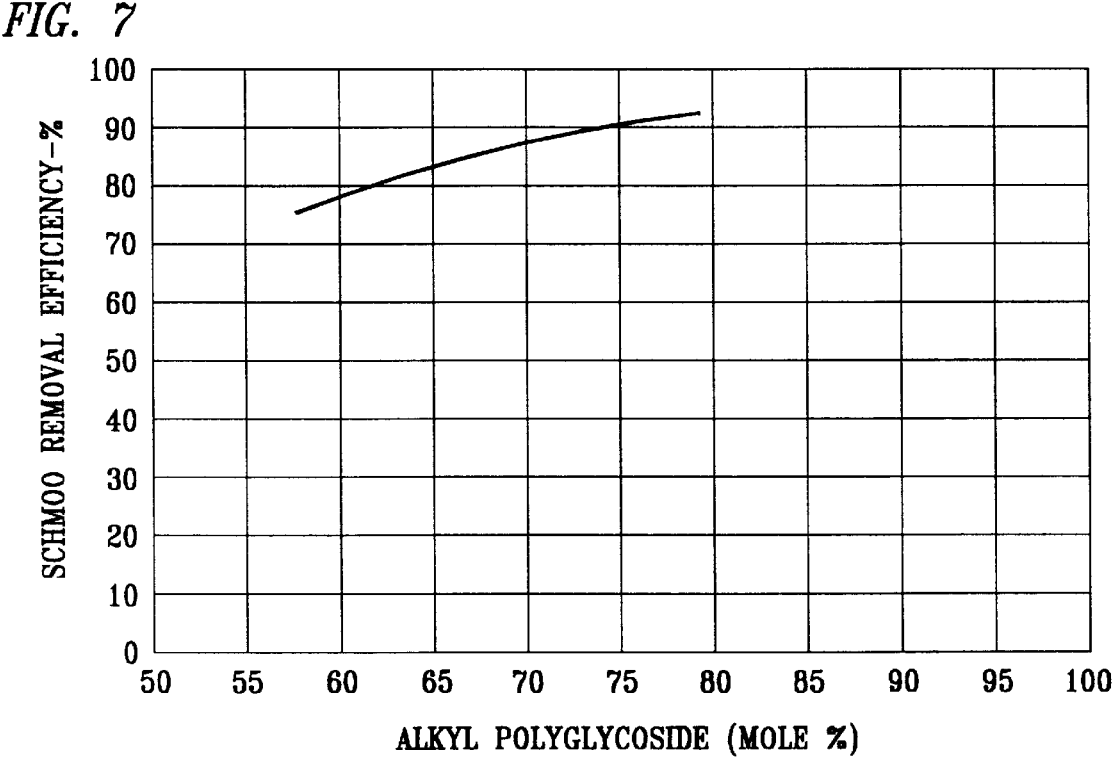
FIG. 7 graphically shows the test results from Example 1.

An evaluation of various dispersant formulations was done using a cleaning test. Metal coupons (10 cm×15 cm strips of carbon steel sheet stock) were first weighed. Schmoo was then applied to the coupons, and then the schmoo-coated coupons were baked at 110° F. in an oven. This process was repeated until the schmoo layer was about 6 mm (0.25") thick. The coupons were then reweighed—the difference being the weight of schmoo applied. Each coupon was then submerged in 30 cc of test dispersant held in a 42-cc vial; the coupons were then allowed to soak undisturbed for the prescribed length of time (typically 3 hours). During this soak time, the temperatures of the vials were maintained at 150° F. in an air bath. After the prescribed time, the vials were placed in a rotator (held in a 60° angle from the horizontal plane) and then rotated at 24 rpm for 15 minutes. Rotation of the vials provided a controlled and reproducible amount of agitation to remove any lightly adhering schmoo residue. The coupons were then removed, dried, and reweighed. The difference between the pre- and post-clean weights was the amount of schmoo removed by the dispersant. The amount of schmoo removed divided by the amount of schmoo applied was the "schmoo removal efficiency" for that combination of formulation, soak time, and temperature. Such cleaning tests were performed for various dispersant formulations, with each test series being repeated three times to test reproducibility. When testing different formulations, typically the total weight % of the alkyl polyglycoside (APG)+ethoxylated alcohol (EA) was held constant, and the relative amounts of the two surfactants were varied (0<APG/(APG+EA)<1). The results were plotted as the schmoo removal efficiency versus mole % of APG for the dispersant and are shown in FIG. 7. Good schmoo removal was achieved in all tests shown. The dispersant contained 1.5 weight percent of APG and EA, 1.5 weight percent of N-Butanol, and 2.75 weight percent of sodium hydroxide.

Having thus described the present invention by reference to certain of its preferred embodiments, it is pointed out that many variations and modifications are possible within the scope of the present invention. Many such variations and modifications may be considered obvious and desirable by those skilled in the art based upon the foregoing description of preferred embodiments.

We claim:

1. A method for cleaning a wellbore plugged with deposits comprising heavy hydrocarbonaceous materials and finely-divided inorganic solids, the method comprising:
    a) positioning a coiled tubing to extend from a surface into the wellbore;
    b) injecting a surfactant composition comprising an aqueous solution containing:
        1) about 0.1 to about 10.0 weight percent of an alkyl polyglycoside surfactant selected from alkyl polyglycosides containing alkyl groups containing from about 8 to about 19 carbon atoms and mixtures thereof;
        2) about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl alcohols and the ethoxylated alkyl phenols;
        3) about 0.5 to about 10.0 weight percent of a caustic selected from the group consisting of sodium hydroxide, potassium hydroxide, ammonium hydroxide and mixtures thereof; and,
        4) about 0.1 to about 6.0 weight percent of at least one alkyl alcohol containing from about 4 to about 6 carbon atoms; through the coiled tubing into contact with the deposits at a velocity sufficient to agitate a top layer of the deposits; and,
    c) circulating at least a portion of the surfactant composition through the wellbore.

2. The method of claim 1 wherein at least a portion of the surfactant composition is recovered by flowing the injected surfactant composition upwardly through an annular space in the wellbore outside the coiled tubing.

3. The method of claim 1 wherein the coiled tubing is positioned to inject the surfactant composition near the top of the deposits in the wellbore.

4. The method of claim 1 wherein the alkyl polyglycoside, ethoxylated alcohol and alkyl alcohol comprise about 0.5 to about 6.0 weight percent of the aqueous solution.

5. The method of claim 1 wherein the alkyl polyglycoside surfactant has a DP number from about 1.30 to about 1.80.

6. The method of claim 1 wherein the alkyl polyglycoside contains Guerbet alkyl groups containing from 9 to 19 carbon atoms.

7. The method of claim 1 wherein the ethoxylated alcohol is present in an amount equal to from 0.2 to about 4.0 weight percent.

8. The method of claim 1 wherein the ethoxylated alcohol is selected from the group consisting of ethoxylated alkyl alcohols containing from about 8 to about 16 carbon atoms in the alkyl alcohol and from about 2 to about 6 ethylene oxide groups.

9. The method of claim 1 wherein the caustic material is present in an amount equal to from about 1.0 to about 5.0 weight percent.

10. The method of claim 1 wherein the linear alcohol is present in an amount equal to from about 0.2 to about 3.0 weight percent.

11. The method of claim 1 wherein a quantity of surfactant composition is injected into a formation in fluid communication with the wellbore after removal of at least a major portion of the deposits from the wellbore and maintained in the formation for a period of time from about 1 hour to about 4 hours.

12. The method of claim 1 wherein the alkyl polyglycoside contains alkyl groups containing even numbers of carbon atoms from 8 to 18 carbon atoms.

13. A method for cleaning a wellbore plugged with deposits comprising heavy hydrocarbonaceous materials and finely-divided inorganic solids, the method comprising:
    a) positioning a coiled tubing to extend from a surface into the wellbore;
    b) injecting a surfactant composition comprising an aqueous solution containing:
        1) about 0.1 to about 10.0 weight percent of an alkyl polyglycoside surfactant selected from alkyl polyglycosides consisting essentially of alkyl polyglycosides selected from the group consisting of alkyl polyglycosides containing alkyl groups containing an odd number of carbon atoms from about 9 to about 13 atoms and having an oligomer distribution from 1 to 12 and a second surfactant consisting essentially of alkyl polyglycosides selected from the group consisting of alkyl polyglycosides containing alkyl groups containing from about 12 to about 19 carbon atoms and having an oligomer distribution from 1 to 12;

2) about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl alcohols and the ethoxylated alkyl phenols;

3) about 0.5 to about 10.0 weight percent of a caustic selected from the group consisting of sodium hydroxide, potassium hydroxide, ammonium hydroxide and mixtures thereof; and, 4) about 0.1 to about 6.0 weight percent of at least one alkyl alcohol containing from about 4 to about 6 carbon atoms; through the coiled tubing into contact with the deposits at a velocity sufficient to agitate a top layer of the deposits; and, c) circulating at least a portion of the surfactant composition through the wellbore.

14. The method of claim 13 wherein the alkyl polyglycoside surfactant contains from about 20 to about 90 mole percent of the first surfactant.

15. The method of claim 13 wherein the second surfactant contains alkyl polyglycosides containing alkyl groups containing odd numbers of carbon atoms from about 9 to about 19 carbon atoms.

16. The method of claim 13 wherein the second surfactant contains alkyl polyglycosides containing alkyl groups containing even numbers of carbon atoms.

17. The method of claim 13 wherein a quantity of surfactant composition is injected into a formation in fluid communication with the wellbore after removal of at least a major portion of the deposits from the wellbore and maintained in the formation for a period of time from about 1 hour to about 4 hours.

* * * * *